United States Patent [19]

Taylor

[11] Patent Number: 4,941,157
[45] Date of Patent: Jul. 10, 1990

[54] SLOW PERIPHERAL HANDSHAKE INTERFACE CIRCUIT

[75] Inventor: Billy K. Taylor, Columbia, S.C.

[73] Assignee: NCR Corporation, Dayton, Ohio

[21] Appl. No.: 338,832

[22] Filed: Apr. 14, 1989

[51] Int. Cl.⁵ .......................................... H04B 17/00
[52] U.S. Cl. ................................ 375/121; 340/825.07
[58] Field of Search .............................. 375/7, 8, 121;
    340/825.07, 825.08, 825.14, 825.21; 178/2 R, 3;
    371/30, 33; 379/93, 97, 98

[56] References Cited

U.S. PATENT DOCUMENTS

| | | | |
|---|---|---|---|
| 3,457,550 | 7/1969 | Gibson et al. | 375/121 |
| 3,919,692 | 11/1975 | Kronies et al. | 364/200 |
| 3,979,732 | 9/1976 | Hepworth et al. | 364/200 |
| 4,390,967 | 6/1983 | Eglowstein | 340/825.21 |
| 4,390,969 | 6/1983 | Hayes | 375/121 |
| 4,446,459 | 5/1984 | Bond, Jr. et al. | 340/825.1 |
| 4,451,886 | 5/1984 | Guest et al. | 340/825.07 |
| 4,476,527 | 10/1984 | Clayton, IV | 364/200 |
| 4,497,041 | 1/1985 | Braun | 364/900 |
| 4,727,370 | 2/1988 | Shih | 340/825.07 |
| 4,785,469 | 11/1988 | Joshi et al. | 375/110 |

Primary Examiner—Benedict V. Safourek
Attorney, Agent, or Firm—Wilbert Hawk, Jr.; Stephen F. Jewett; Douglas S. Foote

[57] ABSTRACT

The subject invention is an interface circuit between a requesting device and a responding device. The circuit comprises a flip-flop responsive to a request signal received from the requesting device and a handshake signal received from the responding device to generate a control signal. The circuit also comprises a gate for receiving the control and handshake signals and generating an acknowledge signal. The removal of the request signal sets the control signal to a first value which disables the gate and removal of the handshake signal resets the control signal to a second value which enables the gate.

21 Claims, 2 Drawing Sheets

SLOW PERIPHERAL HANDSHAKE INTERFACE CIRCUIT

The present invention relates to an interface circuit between a processor and a relatively slower operating peripheral device.

BACKGROUND OF THE INVENTION

As the speed of devices and chips in computer systems increase, a generic problem which arises is how to integrate them with relatively slower components of the system. One solution is to synchronize the various elements with a system clock. This requires the clock cycle to be no faster than the response time of the slowest such element. An obvious drawback of this approach is that the system is forced to operate at the speed of the slowest element, thereby wasting the potential of the faster elements.

A specific problem to which the present invention is directed involves the application of a microprocessor chip with a relatively slower peripheral device. The microprocessor starts a data transfer operating cycle to the peripheral by asserting its address strobe. The address strobe is essentially a request signal for sending or receiving data. After a delay (the response time of the peripheral) the peripheral acknowledges the address strobe by sending a handshake signal to the microprocessor. When the microprocessor sees the handshake signal it removes its address strobe. In response, the peripheral removes the handshake signal and a new cycle may commence. A problem can arise if the fast microprocessor starts a new operating cycle by asserting a new address strobe signal before the peripheral is able to remove its first handshake signal. The microprocessor may interpret this residual handshake signal as a new handshake and terminate the new bus cycle prematurely.

OBJECTS OF THE INVENTION

It is therefore an object of the present invention to provide a new and improved interface circuit between a microprocessor and interface device.

It is another object of the present invention to provide an interface circuit between a microprocessor and a relatively slower peripheral device.

It is a further object of the present invention to provide a new and improved computer system which integrates elements having differing operating speeds.

It is yet another object of the present invention to provide an efficient and simplified interface circuit between two elements of a computer system.

SUMMARY OF THE INVENTION

One form of the present invention is an interface circuit between a requesting device and a responding device. The circuit comprises means for receiving a request signal from the requesting device and a handshake signal from the responding device and generating a control signal. The circuit further comprises a gate for receiving the control and handshake signals and generating an acknowledge signal. The removal of the request signal sets the control signal to a first value which disables the gate and removal of the handshake signal resets the control signal to a second value which enables the gate.

DESCRIPTION OF A PREFERRED EMBODIMENT

Figure 1:
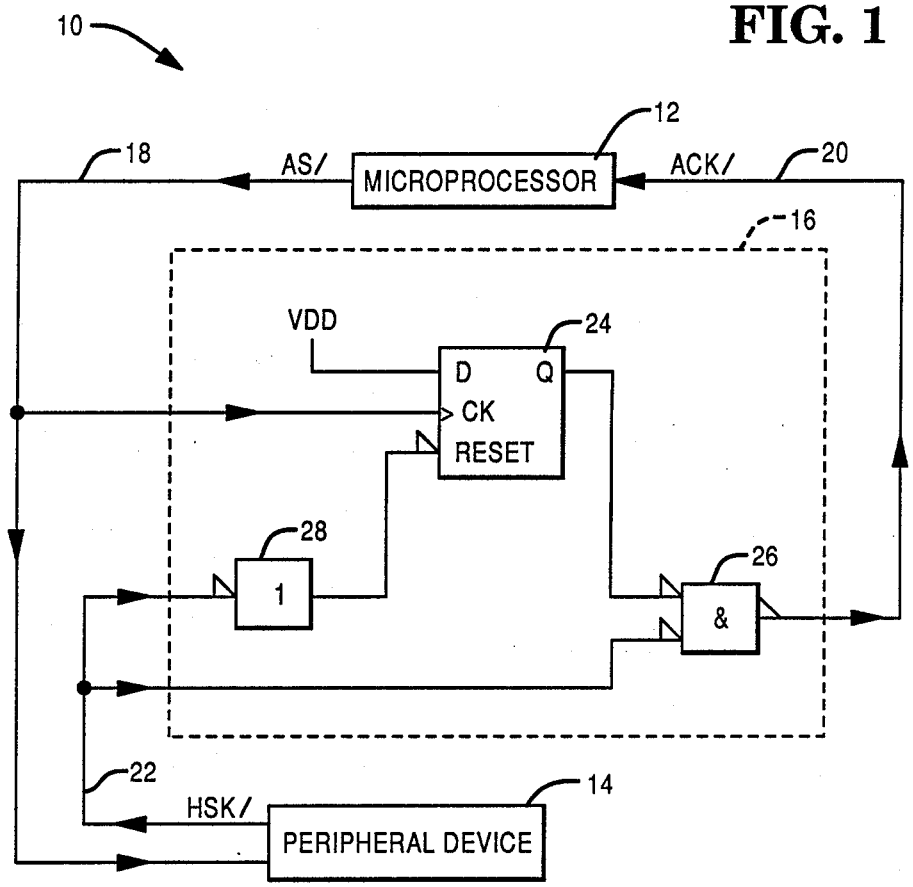
FIG. 1 is a circuit diagram showing one form of the present invention.

FIG. 1 shows a computer system 10 having a microprocessor 12, a peripheral device 14 and an interface circuit 16. Microprocessor 12 is connected to control lines 18 and 20. Microprocessor 12 generates a request signal such as an address strobe (AS/) signal which is transmitted over control line 18 to peripheral device 14. The purpose of the address strobe signal is to request transfer of data either to or from the peripheral device 14. Control line 20 receives an acknowledge (ACK/) signal on line 18 in response to the request signal. Peripheral device 14 is connected to control lines 18 and 22. Peripheral device 14 receives the address strobe signal from microprocessor 12 on line 18 and in response generates a handshake (HSK/) signal which is transmitted over line 22. Interface circuit 16 is connected to control lines 18 and 22 for receiving the address strobe signal and handshake signal, respectively, thereover. Interface circuit 16 is also connected to control line 20 for transmission of the acknowledge signal.

In brief, interface circuit 16 receives the HSK/ signal and retransmits it as the ACK/ signal. Circuit 16 is deactivated by the removal of the AS/ signal by microprocessor 12, thereby preventing such retransmission. Circuit 16 is reactivated by the removal of the HSK/ signal, thereby allowing retransmission of the next received HSK/ signal. It should be clear that the ACK/ signal is derived from the HSK/ signal. As will be explained, under certain operating conditions the trailing edge of the ACK/ signal will precede the trailing edge of the HSK/ signal.

Interface circuit 16 includes a D-type flip-flop 24, a two input AND gate 26 with inverting inputs and inverting output, and an inverter 28. D-type flip-flop 24 has a data input D, a clock input CK, a RESET input and a Q output. Data input D is connected to a power potential source VDD, which in a preferred embodiment provides a high logic value. Clock input CK/ is connected to control line 18 thereby receiving the address strobe signal. The RESET input is connected to the output of inverter 28. The Q output is connected to one of the two inputs of AND gate 26. The other input to AND gate 26 is connected to line 22 for receiving the handshake signal from peripheral device 14. As noted, both inputs to AND gate 26 are inverted, and AND gate 26 has an inverting output which is connected to line 20.

Each of the address strobe, handshake and acknowledge signals is a binary signal having either a high or low logic value. In a preferred embodiment, the address strobe signal, handshake signal and acknowledge signal are each active low signals meaning they are high when off and are low when asserted.

Figure 2:
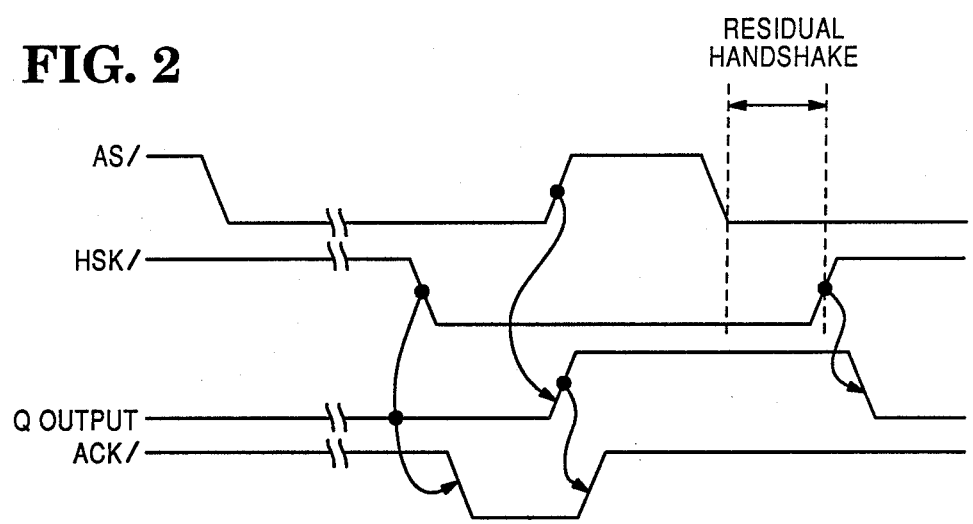
FIG. 2 is a timing diagram illustrating the operation of the circuit shown in FIG. 1.

The operation of system 10 will be explained with respect to the timing diagram of FIG. 2 and with reference to the structure shown in FIG. 1. The four signals of interest are the address strobe (AS/), handshake (HSK/), Q output, and acknowledge (ACK/) signals. Prior to the start of a bus cycle, AS/, HSK/ and ACK/ are all inactive high and the Q output has been reset to a low logic value. Microprocessor 12 commences a bus cycle by asserting AS/ to an active low value. Peripheral 14 receives AS/ over line 18 and responds by asserting HSK/ low. With HSK/ and Q output both low, the inverted output AND gate 26 provides an active low ACK/ signal to microprocessor 12. After receiving the ACK/ signal, microprocessor 12 removes its AS/ signal by setting it high. When AS/ goes high, flip-flop 24 responds to the leading edge of the AS/ signal appearing on its CK input and "clocks in" the high value from VDD on its D input. This sets the Q output signal to a high value. It will be appreciated that as long as the Q output is high, AND gate 26 is effectively disabled as far as transmitting a low HSK/ signal as a low ACK/ signal. In other words, the inverted output of AND gate 26 (the ACK/ signal) becomes inactive high and cannot again respond to a low signal from peripheral 14 until the Q output is reset low.

If microprocessor 12 has a faster response time than peripheral 14, microprocessor 12 might assert AS/ active low before peripheral 14 removes HSK/. This so called "residual" handshake could be interpreted as a handshake for the new bus cycle but for the subject invention. Since the Q output is high at this point, AND gate 26 is disabled so the ACK/ signal received by microprocessor 12 remains inactive high. When peripheral 14 finally removes the HSK/ signal from the first bus cycle, the output of inverter 28 goes low which resets the Q output of flip-flop 24 to a low level. This enables AND gate 26 so that as soon as peripheral 14 responds to the new AS/ signal, the inverted output of AND gate 26 is set to provide an active low ACK/ signal in response.

It will be clear to those skilled in the art that the present invention is not limited to the specific embodiment disclosed and illustrated herein. For example, the invention is not limited to systems with microprocessors and peripheral devices, but it applies to any device which may generate a request signal and any other device which may receive such request and generate a handshake signal in response thereto. Further, the invention in a broader sense is not limited to a D-type flip-flop 24, but may include other types of latches and storage devices for receiving a request and handshake signal and generating a control signal at its output. Similarly, the invention is not limited to an AND gate 26 with inverting inputs and output, but it may apply equally to any two-input coincident gate wherein a control signal having a predetermined logic value applied to one of the inputs effectively enables the gate with the inverse logic value disabling the gate. An important feature of various alternative embodiments is that removal of the request signal sets the control signal to a value which disables the gate and removal of the handshake signal resets the control signal to the inverse value which enables the gate.

The address strobe, handshake and acknowledge signals can all be active high signals or may be mixed as active high and low signals. Depending on whether these signals are to be active high or low will determine the type of latch and/or coincidence gate to be employed in interface circuit 16. Furthermore, inverter 28 may be eliminated for certain embodiments. For example, if flip-flop 24 has a reset input that responds to a rising edge, the reset input may be connected directly to line 22.

Numerous other modifications, variations, and full and partial equivalents can be undertaken without departing from the invention as limited only by the spirit and scope of the appended claims.

What is desired to be secured by Letters Patent of the United States is as follows.

What is claimed is:

1. A computer system comprising:
   a microprocessor for generating an address strobe signal and receiving an acknowledge signal;
   a peripheral device for receiving said address strobe signal and generating a handshake signal in response thereto;
   a D-type flip-flop having a data input connected to a first logic value source, a clock input for receiving said address strobe signal, a reset input, and a Q output;
   a two input AND gate, with inverting inputs and output, for receiving said handshake signal and the signal from said Q output and generating said acknowledge signal; and
   an inverter for receiving said handshake signal and having an output connected to said flip-flop reset input;
   wherein said Q output provides a first logic value which disables said AND gate and a second logic value which enables said AND gate; and
   wherein removal of said address strobe signal sets the Q output to said first value and removal of said handshake signal resets the Q output to said second value.

2. The system of claim 1 wherein said address strobe signal, handshake signal and acknowledge signal are each active low signals, and wherein said first logic value is high and said second logic value is low.

3. A system comprising:
   a first device for generating a request signal and connected to receive an acknowledge signal;
   a second device connected to receive said request signal and for generating a handshake signal in response thereto;
   means connected to receive said request and handshake signals and for generating a control signal in response thereto, wherein removal of said request signal sets said control signal to a first value and removal of said handshake signal resets said control signal to a second value; and
   a gate connected to receive said control and handshake signals and for generating said acknowledge signal in response thereto, said gate being disabled when said control signal is set to said first value and being enabled when said control signal is reset to said second value.

4. The system of claim 3 wherein said means includes a latch.

5. The system of claim 4 wherein said latch is a D-type flip-flop having a data input connected to a first logic value source, a clock input, a reset input, and a Q output.

6. The system of claim 5 wherein said clock input receives said request signal, said reset input receives said handshake signal, and said Q output provides said control signal.

7. The system of claim 6 wherein said request signal, handshake signal and acknowledge signal are each active low signals.

8. The system of claim 7 wherein the first value of said control signal is high and the second value is low.

9. The system of claim 3 wherein said gate is a coincidence gate.

10. The system of claim 9 wherein said gate two input AND gate, with inverting inputs and output.

11. The system of claim 5 further comprising an inverter for receiving said handshake signal and having an output connected to said reset input.

12. The system of claim 3 wherein said first device is a micro processor and said second device is a peripheral.

13. The system of claim 11 wherein said request signal is an address strobe signal.

14. An interface circuit between a requesting device and a responding device comprising:
   means for receiving a request signal from said request device and a handshake signal from said responding device and generating a control signal in response thereto, wherein removal of said request signal sets said control signal to a first value and removal of said handshake signal resets said control signal to a second value; and
   a gate for generating an acknowledge signal, said gate having a first input connected to receive said control signal and a second input for receiving said handshake signal, said gate being disabled when said control signal is set to said first value and being enabled when said control signal is reset to said second value.

15. The system of claim 14 wherein said means is a D-type flip-flop having a data input for receiving a first logic value, a clock input for receiving said request signal, a reset input for receiving said handshake signal, and a Q output for providing said control signal.

16. The system of claim 15 wherein said request signal, handshake signal and acknowledge signal are each active low signals.

17. The system of claim 16 wherein the first value of said control signal is high and the second value is low.

18. The system of claim 14 wherein said gate is a coincidence gate.

19. The system of claim 18 wherein said gate is a two input AND gate, with inverting inputs and output.

20. The system of claim 15 further comprising an inverter for receiving said handshake signal and having an output connected to said reset input.

21. An interface circuit between a requesting device and a responding device comprising:
   an inverter for receiving a handshake signal from said responding device and generating an inverted handshake signal;
   a D-type flip-flop having a data input connected to receive a first logic value, a clock input for receiving a request signal from said requesting device, a reset input connected to receive said inverted handshake signal, and a Q output for generating a control signal, wherein removal of said request signal sets said control signal to a first value and removal of said inverted handshake signal resets said control signal to a second value; and
   a two input AND gate for generating an acknowledge signal for said requesting device, said gate having a first inverting input connected to receive said control signal, a second inverting input connected to receive said inverted handshake signal, and an inverting output, said gate being disabled when said control signal is set to said first value and being enabled when said control signal is reset to said second value;
   wherein said request signal, handshake signal and acknowledge signal are each active low signals, and said first logic value is high and said second logic value is low.

* * * * *